(No Model.) 5 Sheets—Sheet 1.

T. VAN KANNEL.
PARING BIN STRUCTURE FOR CANNING ESTABLISHMENTS.

No. 434,411. Patented Aug. 12, 1890.

Witnesses:
Hamilton D. Turner
Jos. H. Klein

Inventor:
Theophilus Van Kannel
by his Attorneys
Howson & Howson (No Model.) 5 Sheets—Sheet 2.

T. VAN KANNEL.
PARING BIN STRUCTURE FOR CANNING ESTABLISHMENTS.

No. 434,411. Patented Aug. 12, 1890.

Witnesses:
Hamilton D. Turner
Jos. H. Klein

Inventor:
Theophilus Van Kannel
by his Attorneys
Howson & Howson (No Model.)  5 Sheets—Sheet 3.

T. VAN KANNEL.
PARING BIN STRUCTURE FOR CANNING ESTABLISHMENTS.

No. 434,411.  Patented Aug. 12, 1890.

Witnesses:
Hamilton D. Turner.
Jos. H. Klein.

Inventor:
Theophilus Van Kannel
by his Attorneys
Howson & Howson (No Model.)  5 Sheets—Sheet 4.
T. VAN KANNEL.
PARING BIN STRUCTURE FOR CANNING ESTABLISHMENTS.
No. 434,411.  Patented Aug. 12, 1890.
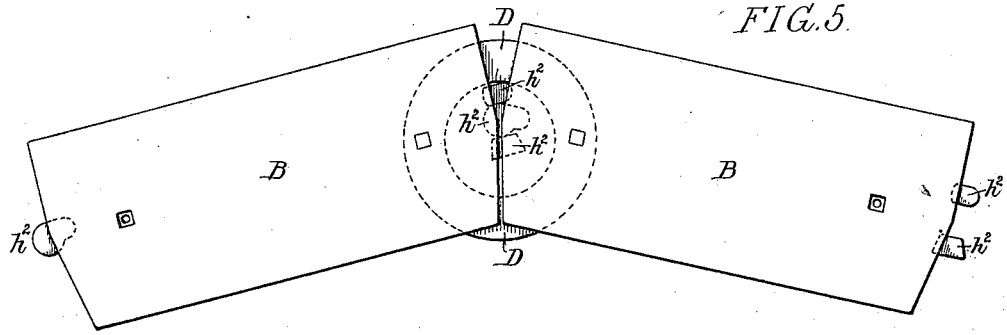
FIG. 5.
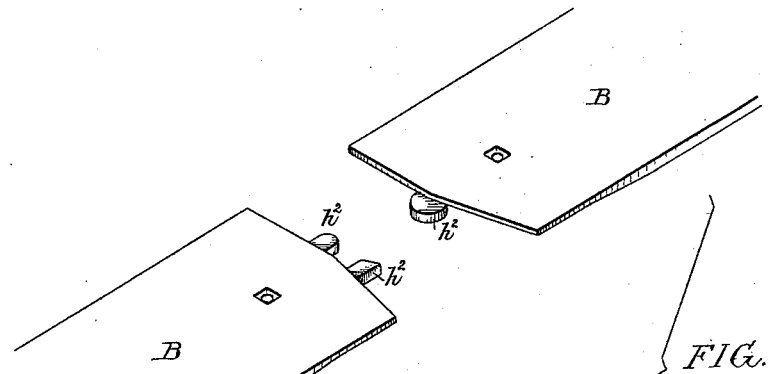
FIG. 6.
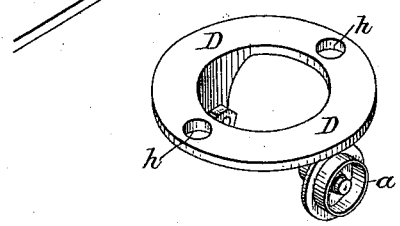
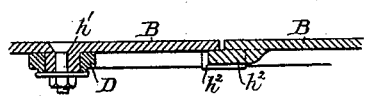
FIG. 7.
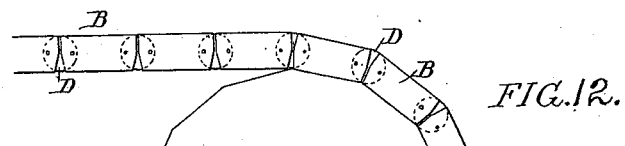
FIG. 12.
Witnesses:
Hamilton D. Turner.
Jos. H. Klein.
Inventor:
Theophilus Van Kannel
by his Attorneys
Howson & Howson
THE NORRIS PETERS CO., PHOTO-LITHO., WASHINGTON, D. C.

(No Model.)　　　　　　T. VAN KANNEL.　　　　5 Sheets—Sheet 5.

PARING BIN STRUCTURE FOR CANNING ESTABLISHMENTS.

No. 434,411.　　　　　　　　Patented Aug. 12, 1890.

Witnesses:
Hamilton D. Turner.
Jos. H. Klein.

Inventor:
Theophilus Van Kannel
by his Attorneys
Howson & Howson

UNITED STATES PATENT OFFICE.

THEOPHILUS VAN KANNEL, OF PHILADELPHIA, PENNSYLVANIA, ASSIGNOR TO THE CANNER'S SUPPLY COMPANY, OF CAMDEN, NEW JERSEY.

PARING-BIN STRUCTURE FOR CANNING ESTABLISHMENTS.

SPECIFICATION forming part of Letters Patent No. 434,411, dated August 12, 1890.

Application filed February 3, 1890. Serial No. 339,014. (No model.)

*To all whom it may concern:*

Be it known that I, THEOPHILUS VAN KANNEL, a citizen of the United States, and a resident of Philadelphia, Pennsylvania, have invented certain Improvements in Paring-Bin Structures for Canning Establishments, of which the following is a specification.

One object of my invention is to provide for use in fruit and vegetable canning establishments efficient and labor-saving mechanism for carrying the fruit or vegetables (hereinafter denominated "stock") from a given point to the work-people, who prepare it for canning, and for conveying said stock after it has been thus prepared to a point whence it may be removed to the filling-machines or otherwise disposed of, a further object being to provide for the accommodation of a large number of work-people in limited space, and a still further object being to insure the collection of all of the refuse matter and its conveyance to any desired point of discharge, so as to protect said refuse matter from contamination, to prevent it from soiling the clothing of the work-people or the floor of the room or apartment in which the work is carried on, and to prevent waste of stock.

These objects I attain in the manner hereinafter set forth, reference being had to the accompanying drawings, in which—

Figure 1:
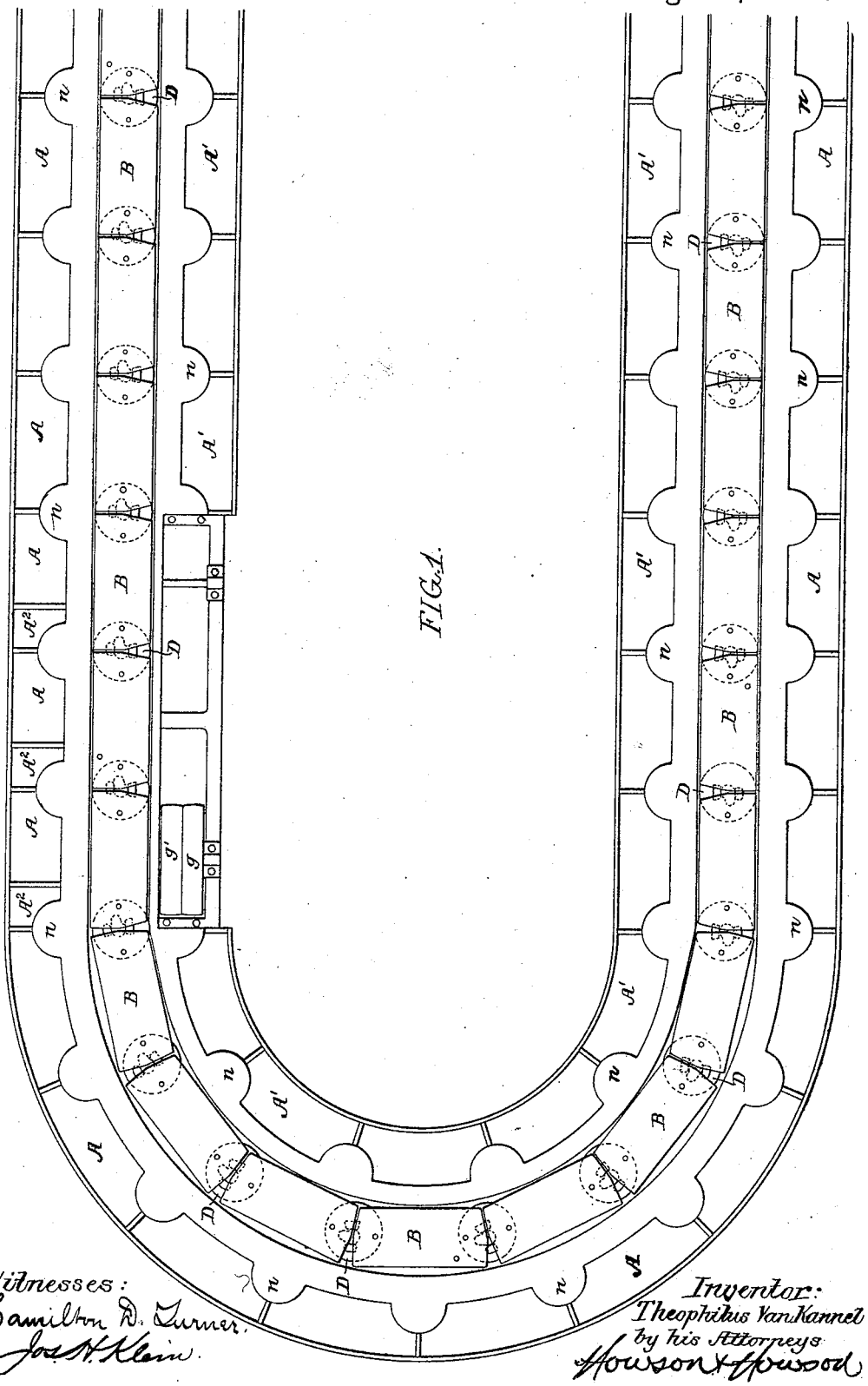
Figure 2:
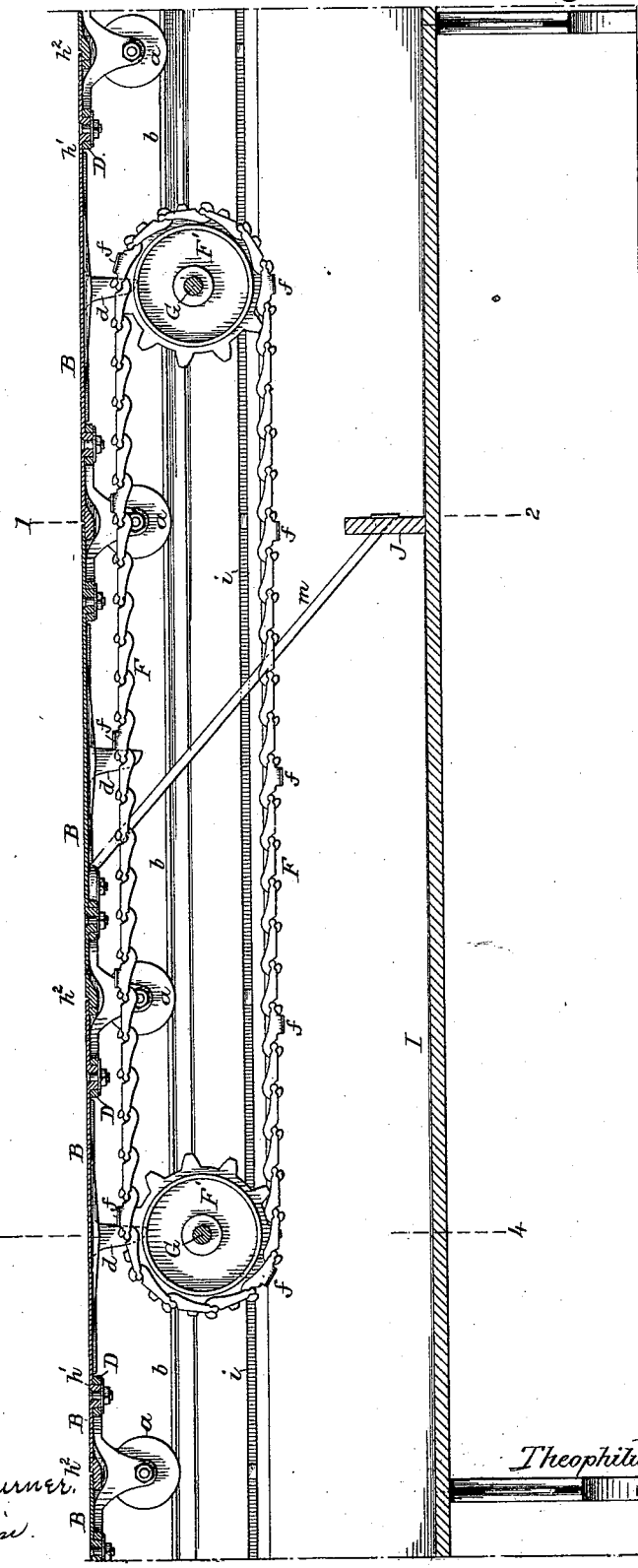
Figure 3:
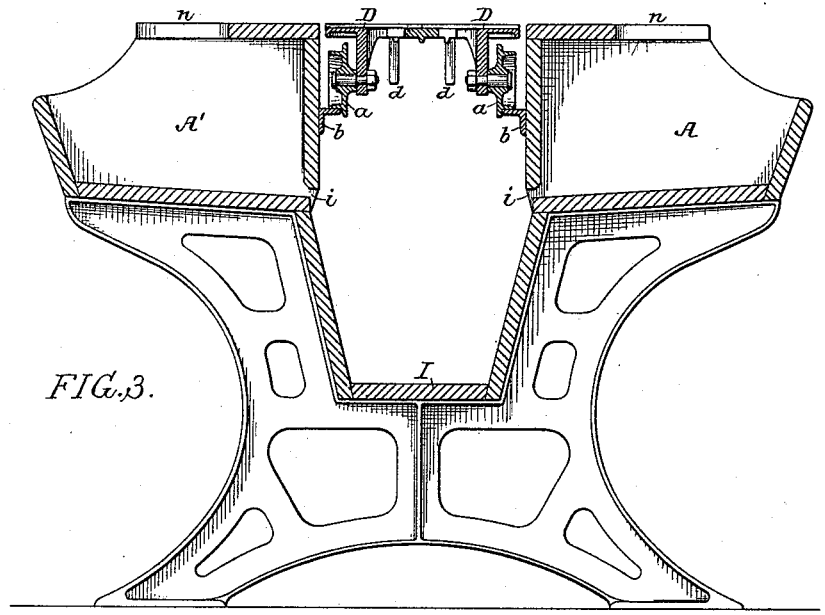
Figure 4:
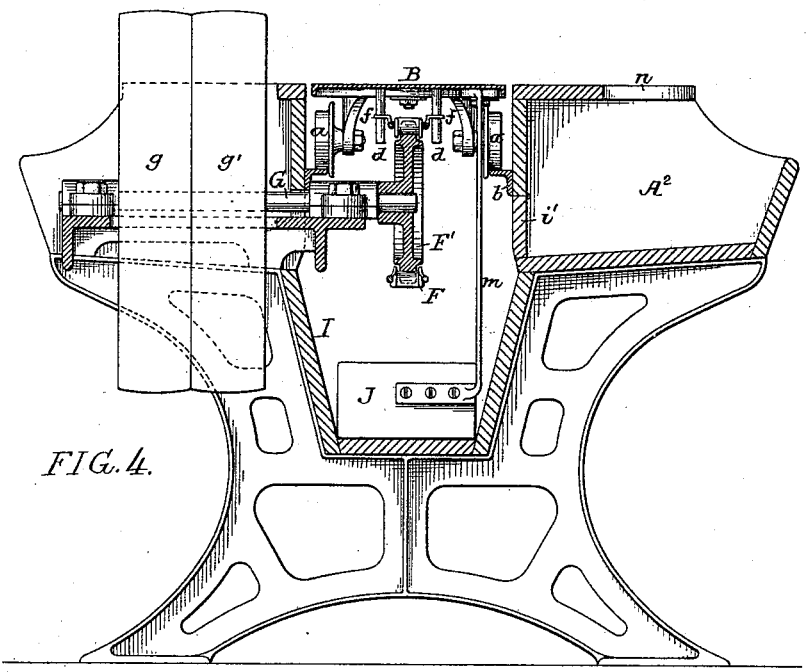
Figure 8:
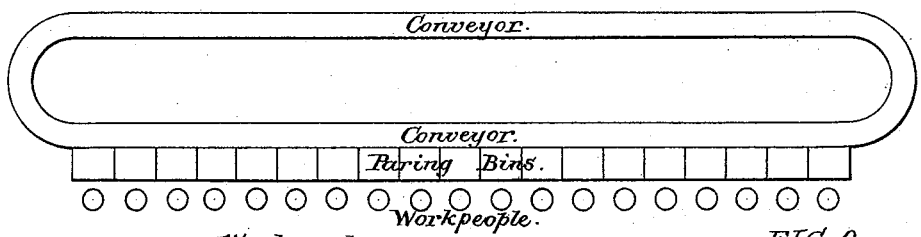
Figure 9:
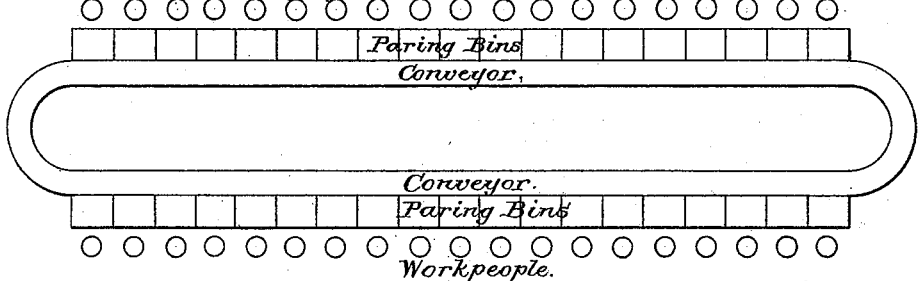
Figure 10:
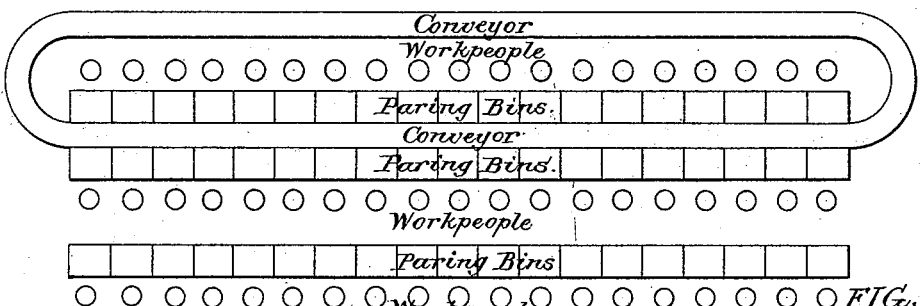
Figure 11:
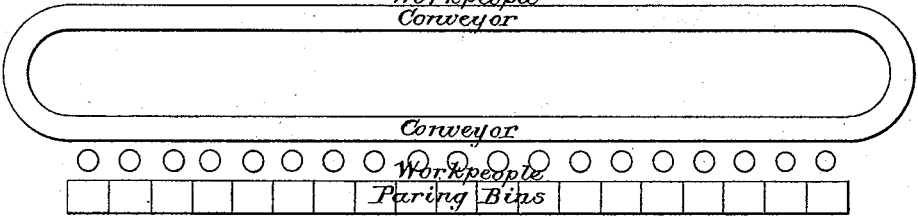

Figure 1 is a plan view of sufficient of the structure to illustrate my invention. Fig. 2 is an enlarged longitudinal section of part of the same. Figs. 3 and 4 are transverse sections, respectively, on the lines 1 2 and 3 4, Fig. 2. Figs. 5, 6, and 7 are detached views of parts of the mechanism; and Figs. 8 to 12 are diagrams illustrating different forms of apparatus embodying the main features of my invention.

In canning establishments as at present conducted the stock is carried in buckets or like receptacles by one set of work-people, usually men, to another set of work-people, usually women or girls, who pare or otherwise prepare for canning the stock delivered to them, the same when thus prepared being carried in buckets or other receptacles to the filling-machines, or to the point, where the next step in the canning operation is to be performed. In extensive establishments not only is the force of men employed for this service quite a large one, but the service is unsatisfactory, as it is practically impossible to gage it so as to accurately meet the demand upon it; hence one set or other of the work-people always waste more or less time. Moreover, the constant carrying to and fro of the buckets or receptacles, sometimes filled to the brim, causes considerable splashing and overflow, thus resulting in waste of stock and in the soiling of the clothing of the work-people and rendering the room in which the work is carried on extremely untidy. The refuse matters resulting from the preparation of the stock for canning must also be carried away as fast as they accumulate, and as this is almost always carelessly done it furnishes another source of waste and untidiness and renders much of the refuse matter unfit for further use—as, for instance, in the manufacturing of catsup, sauces, jellies, jams, &c., or for distillation, as in the production of of fruit spirit. In order to overcome these objections I so arrange the paring-bins that a mechanical conveyer can be combined therewith for the purpose of carrying the stock to and from the work-people, who prepare the same for canning, and I so arrange said conveyer in respect to the bins that the work-people at said bins can both receive the buckets or receptacles from and deliver them to said conveyer, so that one attendant to supply the conveyer and another to remove the buckets of prepared stock therefrom are amply sufficient to perform the duties which in many establishments as now conducted enlist the services of a large number of men and boys. With the conveyer, moreover, I combine a trough and scrapers, said trough communicating with the paring-bins or with the refuse-receptacles therein, so that the parings, juice, and all other refuse matters pass from said bins directly into the trough and are delivered therefrom at any desired point; hence the objections heretofore noted as incident to the present system are effectually overcome, as there is no waste of the stock prepared for canning, no contamination of the refuse matters resulting from the preparation of said stock, and no soiling of the clothing of the work-people, while the apartment in which the work is carried on is kept perfectly clean so far as regards spilling of the stock or refuse in conveying the same to and fro.

In the construction shown in Fig. 1 there are two parallel sets of bins A A', each set comprising opposite straight rows and rounded or angular connecting portions at the ends of said straight rows, it being understood that only about one half of the structure is shown in Fig. 1, the other half being a duplicate of that illustrated.

Between the inner and outer sets of bins is guided and supported an endless platform-conveyor, which consists of successive platforms of cars B, having oppositely-beveled ends, and connected together by trucks D, which carry the journals of the supporting wheels or rollers $a$, the latter running upon tracks $b$, secured to the adjacent sides of the sets of bins. Each of the cars of the conveyer has depending fingers $d$, which engage with projecting ears $f$, formed upon certain of the links of an endless chain F, carried and driven by sprocket-wheels F', one of the latter being secured to a shaft G, which is adapted to suitable bearings upon the frame-work of the machine and has fast and loose pulleys $g$ $g'$ for the reception of a driving-belt from a pulley on any adjacent counter-shaft.

The trucks whereby the cars of the endless conveyer are joined together have openings $h$, each adapted for the reception of a stud $h'$ on the under side of one of the cars, some distance from the end of the same, as shown in Fig. 7, the journals or pins for the supporting-wheels $a$ occupying a mid-position on the trucks, and the journals or pins for the inner wheels being independent of those for the outer wheels, so that in rounding the curved portions of the track at the opposite ends of the structure the axial line of the wheels will always coincide with a radial line drawn from the center of the curve, and there will be neither binding or slip of either wheel while it is traversing the curved track.

The meeting ends of the cars have projecting guide-lugs $h^2$ engaging with each other, as shown in Fig. 5, one of the lugs being rounded so as to permit the cars to assume the necessary angle in respect to each other at the ends of the run of the conveyer. The bearing-points of the guide-lugs $h^2$ are midway between the pivot-pins $h'$, whereby each truck is hung to the adjoining cars, so that in rounding curves the angle is divided between the two cars and excessive lateral movement of the end of either car is prevented at all times.

Between the two rows of bins and supported by the transverse framing of the apparatus is a continuous trough I, which communicates with each of the paring-bins through an opening $i$ in the inner portion of each bin at the bottom of the same, as shown in Fig. 3; hence the parings, juice, and other refuse matter can be conveniently discharged from each bin into the trough, the bottoms of the bins being by preference inclined, as shown in Figs. 3 and 4, so as to provide for the automatic draining of said bins into the trough. The trough may, if desired, only communicate with special refuse-bins $A^2$ at one side of the paring-bins A, (see Fig. 1,) and, if desired, the opening through which the paring or refuse bin communicates with the trough may have a hinged door or flap $i'$, as shown in Fig. 4, for instance, which flap may be under control of the overseer, who can inspect the refuse before it is dumped into the trough, and thus see that no good stock is thrown away with said refuse.

To certain of the links of the conveyer scraping-blades J are hung by means of rods $m$, so that as the conveyer moves these scrapers are drawn along on the bottom of the trough and serve to carry through the same any refuse matter which may enter it, all of this refuse matter being discharged at some one convenient point.

The conveyer being set in motion and the work-people being seated at the various bins, the attendant places the buckets of stock upon the cars of the conveyer, and as the latter are carried along past the bins the work-people remove the buckets from the conveyer until each has received a supply upon which to set to work, each bin being provided with a shelf $n$, upon which the bucket can be drawn from the conveyer preparatory to dumping its contents into the bin or paring-bucket, and returning the empty stock-bucket to the conveyer, by which it is carried back to the starting-point, to be removed and refilled.

The stock after being pared or otherwise prepared is placed by each of the work-people in a bucket having a distinguishing number or other mark, and this bucket is placed upon the conveyer, to be carried to the point at which it is to be removed by the second attendant, the empty bucket being then returned to the conveyer for reconveyance to the person to whom it belongs, any suitable tally being kept of the number of buckets of prepared stock forwarded by each of the work-people, so as to insure a correct account of the work done by each.

As the buckets are practically in continuous motion along the set of bins, the work-people can readily keep themselves supplied with stock, and as the buckets of prepared stock are conveyed without any swing or jolt any waste of stock from this cause is prevented.

Buckets of water for washing purposes can at the end of the day's work be rapidly delivered to the different work-people by means of the conveyer.

Although I have shown the conveyer as applied to a double set of bins—one on each side of the conveyer—and although it is preferred to use it in this way in practice, owing to the fact that it provides for the accommodation of the maximum number of work-people within a given floor-space, it will be evident that the conveyer can be used in connection with a single set of bins as well, if desired. For instance, in Fig. 8 I have shown it as combined with a single row of bins extending along the outside of but a single run of the conveyer, while in Fig. 9 I have shown a row of bins extending along the outside of both runs, and in Fig. 10 I have shown a row of bins both on the outside and inside of a single run of the conveyer, and in Fig. 11 I have shown a conveyer as located between two lines of work-people, who sit with their backs to the conveyer.

Various means of operating the conveyer may also be resorted to without departing from my invention. For instance, the conveyer may be driven by one or more polygonal drums P, acting directly upon the cars of the conveyer, as shown in Fig. 12, although the use of the endless chain as a driving device is preferred in all cases.

The partitions between the various bins are simply used as a matter of convenience for the purpose of separating the supplies of stock delivered to the work-people and for strengthening the structure; but it is evident that the omission of these partitions would not affect the main objects of my invention; hence the term "set of bins" does not necessarily imply the use of partitions.

Having thus described my invention, I claim and desire to secure by Letters Patent—

1. A structure for canning establishments, consisting of a set of paring-bins and an endless conveyer comprising a succession of coupled horizontal platforms, said conveyer extending along the set of bins within reach of the work-people, substantially as specified.

2. A structure for canning establishments, consisting of a set of paring-bins and an endless conveyer comprising a succession of coupled horizontal platforms, said conveyer extending along said set of bins close to the ends of the same and being in substantially the same plane as the tops of the bins and within reach of the work-people at said bins, substantially as specified.

3. A structure for canning establishments, consisting of an endless conveyer comprising a succession of coupled horizontal platforms and a set of paring-bins located so as to conform to the path of said conveyer, the latter being in substantially the same plane as the tops of the bins and within reach of the work-people, substantially as specified.

4. A structure for canning establishments, consisting of inner and outer sets of paring-bins and an endless conveyer comprising a succession of coupled horizontal platforms, said conveyer extending between said sets of bins in substantially the same plane as the tops of the same and within reach of the work-people, substantially as specified.

5. A structure for canning establishments, consisting of an endless conveyer comprising a succession of coupled horizontal platforms with an outer set of paring-bins surrounding said conveyer and an inner set of paring-bins within the same, said conveyer being in substantially the same plane as the tops of the bins and within reach of the work-people, substantially as specified.

6. A structure for canning establishments, consisting of a set of paring-bins located side by side, an endless horizontal platform-conveyer extending along the ends of the bins, and a refuse-trough communicating with the bins and extending throughout the length of the set, substantially as specified.

7. The combination of inner and outer sets of paring-bins, each set comprising a series of bins located side by side, an endless horizontal platform-conveyer located between the sets of bins, and a refuse-trough located between the inner and outer sets of bins and extending throughout the length of the same and communicating with the bins, substantially as specified.

8. The combination of a set of paring-bins located side by side, a refuse-trough communicating with the bins and extending throughout the set, an endless platform-conveyer extending along the ends of the set of bins, and scrapers adapted to the refuse-trough and connected to said endless conveyer, substantially as specified.

9. The combination of inner and outer sets of paring-bins, each set comprising a series of bins located side by side, with a refuse-trough located between said sets of bins, an endless platform-conveyer likewise situated between the sets of bins, and scrapers adapted to the trough and connected to said conveyer, substantially as specified.

10. The combination of a set of bins, an endless conveyer consisting of a succession of horizontal platform-cars and coupling-trucks pivoted to the adjacent ends of adjoining cars, means for driving the conveyer, and supporting-wheels carried by the coupling-trucks, substantially as specified.

11. The combination of the cars having engaging guide-fingers at the ends with the connecting-trucks pivoted to adjoining cars and carrying supporting-wheels, substantially as specified.

12. The combination of the connecting-trucks with the cars pivoted to said trucks, the adjoining ends of each pair of cars having engaging projections the bearing-points of which are midway between the pivots whereby said pair of cars is hung to the truck, substantially as specified.

In testimony whereof I have signed my name to this specification in the presence of two subscribing witnesses.

THEOPHILUS VAN KANNEL.

Witnesses:
WILLIAM D. CONNER,
HARRY SMITH.